(12) United States Patent
Takahashi et al.

(10) Patent No.: US 12,365,239 B2
(45) Date of Patent: Jul. 22, 2025

(54) DRIVE APPARATUS AND VEHICLE

(71) Applicant: NIDEC CORPORATION, Kyoto (JP)

(72) Inventors: Yuta Takahashi, Kyoto (JP); Masato Aono, Kyoto (JP); Takanobu Oyama, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 406 days.

(21) Appl. No.: 17/941,019

(22) Filed: Sep. 9, 2022

(65) Prior Publication Data

US 2023/0088074 A1    Mar. 23, 2023

(30) Foreign Application Priority Data

Sep. 10, 2021 (JP) ................................ 2021-147375
Jun. 29, 2022 (JP) ................................ 2022-104915

(51) Int. Cl.
| | |
|---|---|
| *B60K 17/12* | (2006.01) |
| *B60K 1/00* | (2006.01) |
| *H02K 5/04* | (2006.01) |
| *H02K 7/00* | (2006.01) |
| *H02K 7/08* | (2006.01) |
| *H02K 7/11* | (2006.01) |
| *H02K 7/116* | (2006.01) |

(52) U.S. Cl.
CPC ............. *B60K 17/12* (2013.01); *B60K 1/00* (2013.01); *H02K 5/04* (2013.01); *H02K 7/003* (2013.01); *H02K 7/08* (2013.01); *H02K 7/116* (2013.01); *B60K 2001/001* (2013.01)

(58) Field of Classification Search
CPC .... B60K 17/12; B60K 1/00; B60K 2001/001; H02K 5/04; H02K 7/003; H02K 7/08; H02K 7/116
See application file for complete search history.

(56) References Cited

U.S. PATENT DOCUMENTS

| | | | |
|---|---|---|---|
| 5,101,567 A | * | 4/1992 | Cool ................... B27B 17/083 83/DIG. 1 |
| 5,481,338 A | * | 1/1996 | Todome ............ G03G 15/6564 399/361 |
| 7,193,836 B2 | | 3/2007 | Oh et al. |
| 10,128,705 B2 | | 11/2018 | Yang et al. |
| 2013/0145879 A1 | * | 6/2013 | Nakamura .......... F16H 57/0441 74/467 |

\* cited by examiner

*Primary Examiner* — Bryan A Evans
(74) *Attorney, Agent, or Firm* — HAUPTMAN HAM, LLP

(57) ABSTRACT

A motor shaft of a drive apparatus extends along a first rotation axis extending in an axial direction. A gear portion is connected to one axial side of the motor shaft. A housing tubular portion extends in the axial direction and holds a stator on the radially inner surface. The first lid portion is attached to the other axial end portion of the housing tubular portion. The first bearing of the motor bearing that rotatably supports the motor shaft is a rolling bearing disposed on the first lid portion, and rotatably supports the motor shaft on the other axial side with respect to the rotor. The motor shaft and the first lid portion are electrically insulated by the first bearing.

18 Claims, 6 Drawing Sheets

DRIVE APPARATUS AND VEHICLE

CROSS-REFERENCE TO RELATED APPLICATIONS

The present invention claims priority under 35 U.S.C. § 119 to Japanese Patent Application No. 2021-147375 filed on Sep. 10, 2021 and Japanese Patent Application No. 2022-104915 filed on Jun. 29, 2022, the entire contents of which are incorporated herein by reference.

FIELD OF THE INVENTION

The present invention relates to a drive apparatus and a vehicle.

BACKGROUND

Conventionally, a technique for removing electricity from a motor shaft of an electric motor is known. For example, the radially outer surface of the motor shaft is in contact with a charge dissipation assembly as a neutralization apparatus. As a result, the axial voltage of the motor shaft is grounded.

However, there is a possibility that the electric charges of the motor shaft cannot be sufficiently released only by forming the conductive path in the motor shaft. In particular, in a drive apparatus mounted on an electric vehicle, a rotor, a stator, and a gear portion are accommodated in a housing, and it is important to control potential fluctuation occurring in the housing. For example, potential fluctuation occurs in the motor shaft due to the control of the inverter with respect to the drive current of the stator, whereby electrolytic corrosion is likely to occur. Electrolytic corrosion is a phenomenon in which the inner peripheral surfaces of the outer ring and the inner ring of the rolling bearing are damaged in a wave shape. Electrolytic corrosion occurs when a current flowing from the shaft to the rolling bearing is discharged in the rolling bearing. Therefore, suppression and prevention of electrolytic corrosion are important issues.

SUMMARY

An exemplary drive apparatus of the present invention includes a motor shaft, a rotor, a stator, a gear portion, and a housing. The motor shaft extends along a first rotation axis extending in an axial direction and is rotatable about the first rotation axis. The rotor is rotatable together with the motor shaft. The stator is disposed radially outward of the rotor. The gear portion is connected to one axial side of the motor shaft. The housing accommodates the rotor, the stator, and the gear portion. The housing includes a housing tubular portion, a first lid portion, a second lid portion, and a motor bearing. The housing tubular portion extends in the axial direction and holds the stator on a radially inner surface. The first lid portion is attached to another axial end portion of the housing tubular portion. The second lid portion is disposed on one axial side with respect to the housing tubular portion and expands in a direction intersecting the first rotation axis. The motor bearing rotatably supports the motor shaft. The motor bearing includes a first bearing and a second bearing. The first bearing is a rolling bearing disposed on the first lid portion, and rotatably supports the motor shaft on another axial side with respect to the rotor. The second bearing is disposed on the second lid portion, and rotatably supports the motor shaft on one axial side with respect to the rotor. The motor shaft and the first lid portion are electrically insulated by a first bearing.

An exemplary vehicle of the present invention includes the drive apparatus described above.

The above and other elements, features, steps, characteristics and advantages of the present disclosure will become more apparent from the following detailed description of the preferred embodiments with reference to the attached drawings.

DETAILED DESCRIPTION

Exemplary embodiments will be described with reference to the drawings hereinafter.

Figure 1:
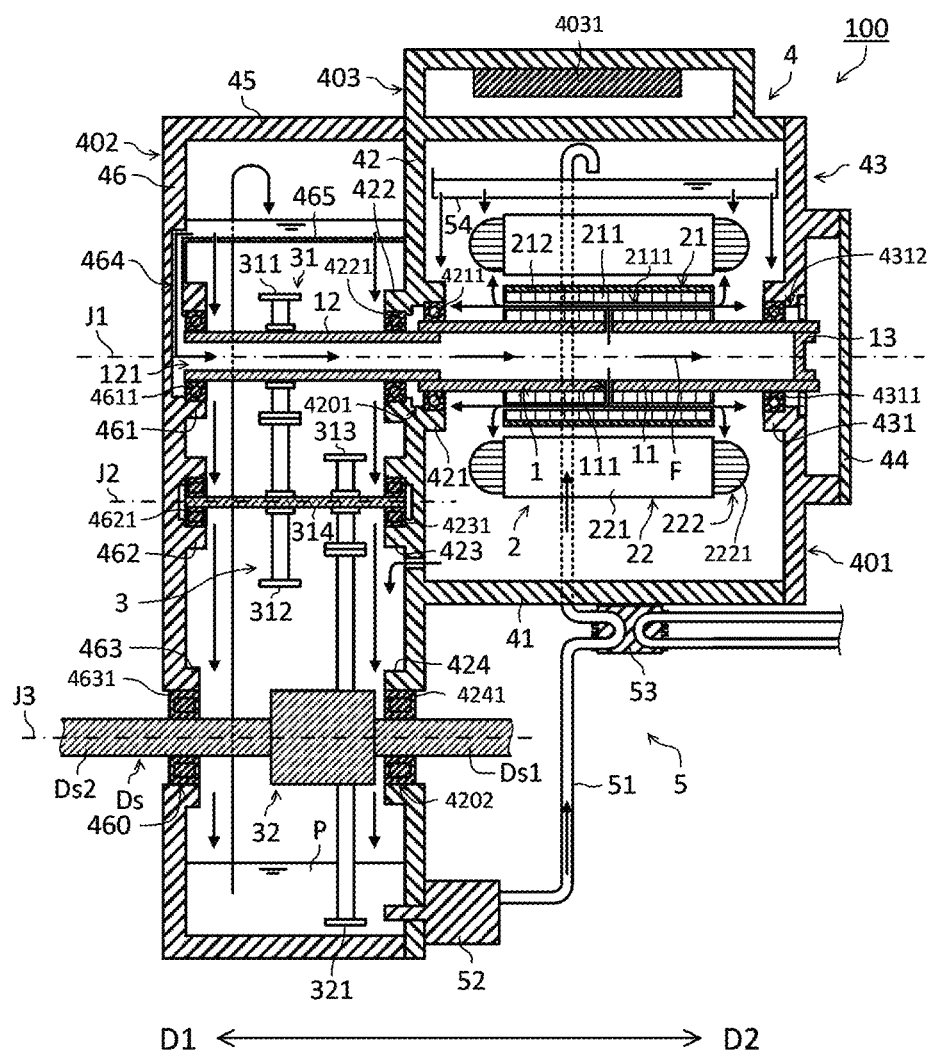
FIG. 1 is a conceptual diagram illustrating a configuration example of a drive apparatus.

In the present specification, a direction parallel to a first rotation axis J1 of a motor 2 is referred to as an "axial direction" of a drive apparatus 100. In the axial direction, as illustrated in FIG. 1, a gear portion 3 side is defined as one axial side D1, and the motor 2 side is defined as the other axial side D2. In addition, a radial direction orthogonal to a predetermined axis, such as the first rotation axis J1, is simply referred to as a "radial direction", and a circumferential direction around the predetermined axis, such as the first rotation axis J1, is simply referred to as a "circumferential direction".

In the present specification, in the positional relationship between any one of orientations, lines, and surfaces and another one, the term "parallel" means not only a state where both never cross each other no matter how long they extend, but also a state where both are substantially parallel. In addition, the term "perpendicular" includes not only a state where both intersect each other at 90 degrees, but also a state where both are substantially perpendicular. That is, the terms "parallel" and "perpendicular" each include a state where the positional relationship between both permits an angular deviation to a degree that does not depart from the gist of the present invention.

In the present specification, an "annular shape" includes not only a shape continuously connected without any cut along the entire circumferential direction about a predetermined axis such as the first rotation axis J1 but also a shape having one or more cuts in a part of the entire circumference direction about the predetermined axis. In addition, a shape that draws a closed curve around a predetermined axis in a curved surface intersecting with the predetermined axis is also included.

In the present specification, the term "extending" in a predetermined direction includes a configuration in which an extending direction is substantially the predetermined direction in addition to a configuration in which the extending direction is strictly the predetermined direction. That is, the term "extending" in the predetermined direction includes a configuration in which there is a directional deviation from the predetermined direction to an extent that does not depart from the gist of the present invention. The same applies to the term "expanding" in a predetermined direction.

Figure 2:
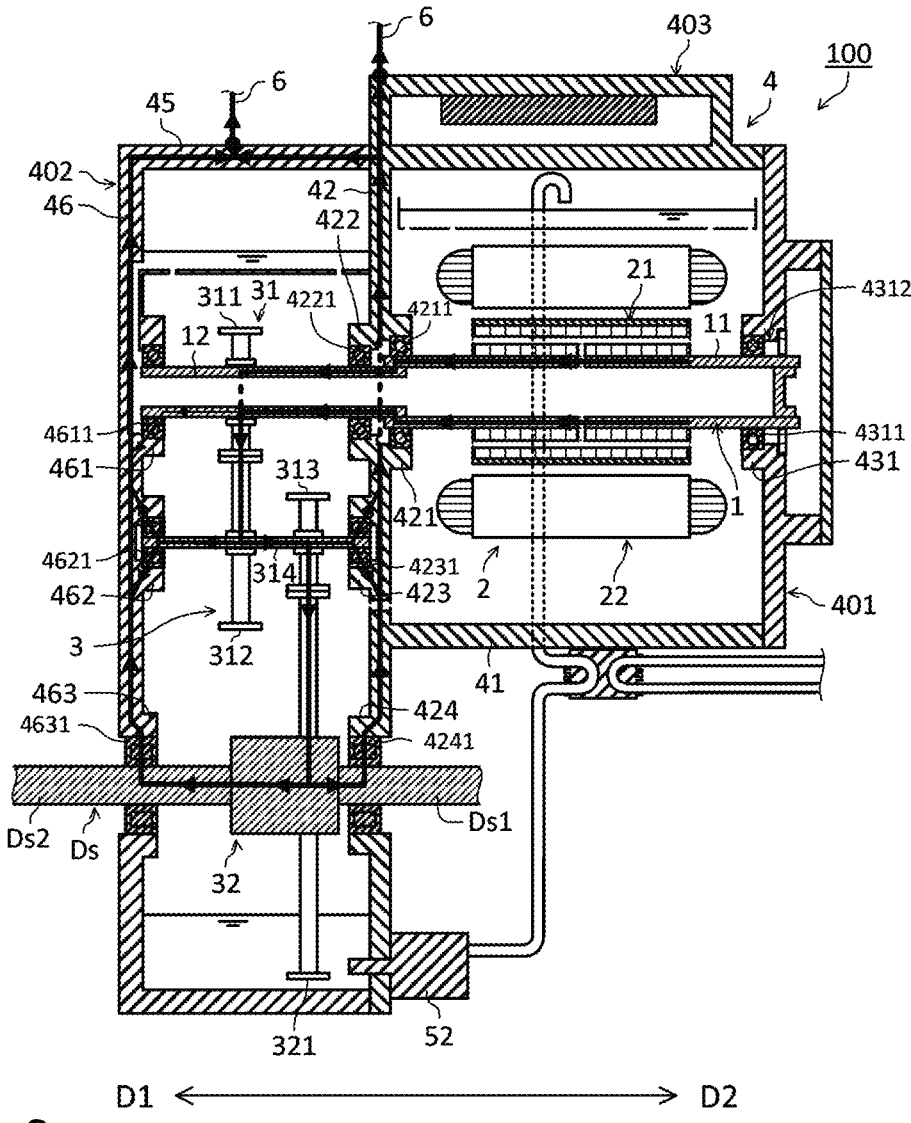
FIG. 2 is a conceptual diagram illustrating a static elimination channel of the drive apparatus according to the embodiment.
Figure 3:
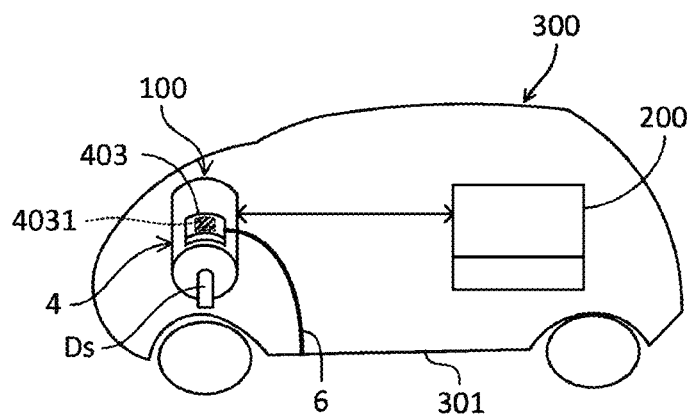
FIG. 3 is a schematic diagram illustrating an example of a vehicle having the drive apparatus mounted thereon.

FIG. 1 is a conceptual diagram illustrating a configuration example of the drive apparatus 100. FIG. 2 is a conceptual diagram illustrating a static elimination channel of the drive apparatus 100 according to the embodiment. FIG. 3 is a schematic diagram illustrating an example of a vehicle 300 having the drive apparatus 100 mounted thereon. Note that FIGS. 1 and 2 are merely conceptual diagrams, and a layout and a dimension of each portion are not necessarily identical to those of the actual drive apparatus 100 in a strict sense. In FIG. 2, a thick solid line with an arrow indicates the static elimination channel. FIG. 3 conceptually illustrates the vehicle 300.

In the present embodiment, as illustrated in FIG. 3, the drive apparatus 100 is mounted on the vehicle 300 using at least a motor as a power source. The vehicle 300 is a hybrid vehicle (HV), a plug-in hybrid vehicle (PHV), or an electric vehicle (EV). The vehicle 300 includes the drive apparatus 100. In the vehicle 300, it is possible to more effectively suppress or prevent the occurrence of electrolytic corrosion in motor bearings 4311, 4211, 4221, and 4611 (in particular, a first rotor bearing 4311) to be described later that support a motor shaft 1 (in particular, a rotor shaft 11 to be described later) of the drive apparatus 100. Referring to FIG. 3, the drive apparatus 100 drives front wheels of the vehicle 300. However, the present invention is not limited to the example illustrated in FIG. 3, and the drive apparatus 100 may drive at least one of the wheels. In addition, the vehicle 300 further includes a battery 200. The battery 200 stores electric power to be supplied to the drive apparatus 100.

As illustrated in FIGS. 1 to 3, the drive apparatus 100 includes a motor shaft 1, a motor 2, a gear portion 3, a housing 4, a fluid circulation portion 5, and an earth connection portion 6.

The motor shaft 1 extends in the axial direction along the first rotation axis J1. The first rotation axis J1 extends in the axial direction. As described above, the drive apparatus 100 includes the motor shaft 1. The motor shaft 1 is rotatable about the first rotation axis J1. As illustrated in FIG. 1, the motor shaft 1 is rotatably supported by the housing 4 via the first rotor bearing 4311, the second rotor bearing 4211, the first gear bearing 4221, and the second gear bearing 4611.

Hereinafter, the first rotor bearing 4311 and the second rotor bearing 4211 may be collectively referred to as "rotor bearings 4211 and 4311". The rotor bearings 4211 and 4311 rotatably support the rotor shaft 11. The housing 4 has the rotor bearings 4211 and 4311.

In addition, the first gear bearing 4221 and the second gear bearing 4611 may be collectively referred to as "gear bearings 4221 and 4611". The gear bearings 4221 and 4611 rotatably support the motor shaft 1 together with the rotor bearings 4211 and 4311. The housing 4 has the gear bearings 4221 and 4611.

Further, the first rotor bearing 4311, the second rotor bearing 4211, the first gear bearing 4221, and the second gear bearing 4611 may be collectively referred to as "motor bearings 4311, 4211, 4221, and 4611". The motor bearings 4311, 4211, 4221, and 4611 rotatably support the motor shaft 1. The housing 4 includes the motor bearings 4311, 4211, 4221, and 4611.

The motor shaft 1 has a tubular shape extending in the axial direction. The motor shaft 1 has conductivity, and is made of metal in the present embodiment. A fluid F flows inside the motor shaft 1. The flow path of the fluid F including the inside of the motor shaft 1 is an example of the "fluid flow path" of the present invention. The drive apparatus 100 further includes this fluid F. Note that the fluid F is a lubricant that lubricates the gear portion 3 and the bearings of the drive apparatus 100, and is, for example, an automatic transmission fluid (ATF) in the present embodiment. In addition, the fluid F is used as a refrigerant for cooling the motor 2 and the like. According to the rotation of the motor shaft 1, the fluid F flowing inside the motor shaft 1 can be supplied to the motor 2, the first rotor bearing 4311, the second rotor bearing 4211, and the like through a shaft through-hole 111 described later. Therefore, a stator 22 (in particular, a coil end 2221 to be described later), the above-described rotor bearings 4211 and 4311, and the like can be cooled by the fluid F.

The motor shaft 1 includes a rotor shaft 11 and a gear shaft 12. The rotor shaft 11 is an example of a "first shaft" of the present invention, and holds a rotor 21. The gear shaft 12 is an example of a "second shaft" of the present invention, and is connected to an end portion of the rotor shaft 11 on one axial side D1. The gear portion 3 is connected to the gear shaft 12. The rotor shaft 11 and the gear shaft 12 have a tubular shape extending in the axial direction and extend along the first rotation axis J1.

In the present embodiment, the both are connected by spline fitting. When the rotor shaft 11 and the gear shaft 12 are spline-fitted to each other, the external teeth formed on the gear shaft 12 side and the internal teeth formed on the rotor shaft 11 side come into contact with each other when the drive apparatus 100 is in the powering state and the regeneration state.

The present invention is not limited to this example, and the rotor shaft 11 and the gear shaft 12 may be connected by screw coupling using a male screw and a female screw, or may be joined by a fixing method such as press fitting and welding. When the fixing method such as press-fitting or welding is adopted, serrations combining recesses and protrusions extending in the axial direction may be adopted. With such a configuration, it is possible to reliably transmit the rotation. However, the present invention is not limited to the example of the present embodiment, and the motor shaft 1 may be a single member.

The rotor bearings 4211 and 4311 are disposed at both axial end portions of the rotor shaft 11. The rotor bearings 4211 and 4311 rotatably support both axial end portions of the rotor shaft 11.

The motor bearings 4311, 4211, 4221, and 4611 have the first rotor bearing 4311. The first rotor bearing 4311 is an example of a "first bearing" of the present invention. The first rotor bearing 4311 is a rolling bearing disposed on a housing lid portion 43 to be described later, and rotatably supports the motor shaft 1 in the other axial side D2 with respect to the rotor 21. As described later, the first rotor bearing 4311 has an insulating portion (see FIGS. 4A to 4C described later). As a result, the motor shaft 1 (that is, the rotor shaft 11) and the housing lid portion 43 are electrically insulated by the first rotor bearing 4311.

As illustrated in FIG. 1 and the like, a first housing tubular portion 41 and the housing lid portion 43 are separate members. Therefore, due to the accumulated tolerance at the time of assembling the housing 4 and the motor shaft 1 including these, the end portion of the motor shaft 1 on the other axial side D2 may swing around the first rotation axis J1. As a result, in the rolling bearing (that is, the first rotor bearing 4311) of the motor shaft 1 on the other axial side D2, the fluid F such as the lubricating oil tends to be biased, and there is a possibility that the increase or decrease due to the local bias of the fluid F occurs in the direction around the first rotation axis J1.

The fluid F cooled by a cooler unit 53 is supplied to the motor bearings 4311, 4211, 4221, and 4611. Here, since the first rotor bearing 4311 is disposed on the housing lid portion 43, it is close to the outside of the drive apparatus 100. Further, as compared with the fluid F supplied to the other motor bearings 4211, 4221, and 4611, the fluid F whose temperature has increased by the heat source such as the stator 22 and the gear portion 3 is less likely to be supplied to the first rotor bearing 4311. Therefore, the fluid F in the first rotor bearing 4311 tends to be thickened depending on the low temperature. Therefore, in the first rotor bearing 4311, the local increase or decrease of the fluid F is more likely to occur in the direction around the first rotation axis J1.

In general, in a rolling bearing, the larger the fluid F such as lubricating oil between a pair of bearing rings (see, for example, FIGS. 4A to 6), the higher the potential difference between the pair of bearing rings. Therefore, in a portion where the fluid F is large, the potential difference easily exceeds the dielectric breakdown voltage.

Therefore, electrolytic corrosion is more likely to occur in the first rotor bearing 4311 than in the other motor bearings 4211, 4221, and 4611.

Therefore, the end portion of the motor shaft 1 (in particular, the rotor shaft 11) on the other axial side D2 and the housing lid portion 43 can be electrically insulated by electrical insulation in the first rotor bearing 4311. Therefore, it is possible to suppress or prevent electrolytic corrosion of the first rotor bearing 4311 in which electrolytic corrosion is most likely to occur. That is, the electrolytic corrosion can be more effectively suppressed or prevented.

In addition, by connecting the gear shaft 12 to the end portion of the rotor shaft 11 on the one axial side D1, the above-described accumulated tolerance tends to be further increased. Therefore, whirling at the end portion of the rotor shaft 11 on the other axial side D2 tends to increase, and local increase and decrease of the fluid F in the first rotor bearing 4311 also tends to further occur. Even with such a configuration, since the rotor shaft 11 and the housing lid portion 43 are electrically insulated by the first rotor bearing 4311, it is possible to suppress or prevent electrolytic corrosion of the first rotor bearing 4311.

The drive apparatus 100 further includes a fluid flow path as described later. The fluid flow path supplies the fluid F for lubricating the rotor bearings 4211 and 4311 to the rotor bearings 4211 and 4311. For example, in the present embodiment, the fluid flow path includes a tray portion 465, a flow path 464, which will be described later, and a flow path including the inside of the motor shaft 1, the shaft through-hole 111, and a rotor through-hole 2111. The fluid flow path includes the fluid circulation portion 5. In this way, in the rotor bearings 4211 and 4311, reduction or exhaustion of the lubricating fluid F can be suppressed or prevented, so that burning or the like of the rotor bearings 4211 and 4311 can be suppressed or prevented.

The motor bearings 4311, 4211, 4221, and 4611 include a second rotor bearing 4211. The second rotor bearing 4211 is an example of a "second bearing" of the present invention. The second rotor bearing 4211 is a rolling bearing disposed on a side plate portion 42 described later of the housing 4, and rotatably supports the motor shaft 1 in the one axial side D1 with respect to the rotor 21. Specifically, the second rotor bearing 4211 rotatably supports the end portion of the rotor shaft 11 on the one axial side D1. The second rotor bearing 4211 has an insulating portion as described later. The motor shaft 1 and the side plate portion 42 are electrically insulated by the second rotor bearing 4211. In this way, the second rotor bearing 4211 can electrically insulate the motor shaft 1 (in particular, the end portion of the rotor shaft 11 on the one axial side D1) from the side plate portion 42, so that electrolytic corrosion of the second rotor bearing 4211 can be suppressed or prevented.

On the one axial side D1 of the motor shaft 1, the electric charges generated by the potential fluctuation flow and are dispersed in the gear portion 3 and the like. Therefore, the ease and degree of occurrence of electrolytic corrosion in the second rotor bearing 4211 are lower than those in the first rotor bearing 4311. Therefore, the electric resistance in the first rotor bearing 4311 is larger than the electric resistance in the second rotor bearing 4211. With such a configuration, it is possible to more effectively suppress or prevent electrolytic corrosion in the first rotor bearing 4311 where electrolytic corrosion is likely to occur. However, this example does not exclude a configuration in which the electric resistance in the first rotor bearing 4311 is equal to or less than the electric resistance in the second rotor bearing 4211.

In addition, the gear bearings 4221 and 4611 are disposed at both axial end portions of the gear shaft 12. The gear bearings 4221 and 4611 rotatably support both axial end portions of the gear shaft 12.

Next, the motor shaft 1 has the shaft through-hole 111. The shaft through-hole 111 is disposed in the rotor shaft 11 and penetrates the tubular rotor shaft 11 in the radial direction. The number of shaft through-holes 111 may be singular or plural. When the motor shaft 1 rotates, the fluid F inside the motor shaft 1 flows out of the rotor shaft 11 through the shaft through-hole 111 by centrifugal force. In the present embodiment, as illustrated in FIG. 1, the shaft through-hole 111 is disposed on the other axial side D2 with respect to the end portion of the rotor 21 on the one axial side D1 and on the one axial side D1 with respect to the end portion of the rotor 21 on the other axial side D2. The shaft through-hole 111 is connected to the rotor through-hole 2111 described later. However, the present invention is not limited to the example of FIG. 1, and the shaft through-hole 111 may be disposed in the one axial side D1 with respect to the end portion of the rotor 21 on the one axial side D1 and on the other axial side D2 with respect to the second rotor bearing 4211, or may be disposed on the other axial side D2 with respect to the end portion on the other axial side D2 of the rotor 21 and on the one axial side D1 with respect to the first rotor bearing 4311. Note that the above-described example does not exclude a configuration in which the shaft through-hole 111 and the rotor through-hole 2111 are omitted.

The motor shaft 1 has an inlet 121. The inlet 121 is an opening at an end portion of the motor shaft 1 on the one axial side D1, and is an opening at an end portion of the gear shaft 12 on the one axial side D1 described later in the present embodiment. The inlet 121 is connected to a flow path 464 of a gear lid portion 46 described later. The fluid F flows into the motor shaft 1 from the flow path 464 through the inlet 121.

The motor shaft 1 further includes a shaft wall portion 13. The shaft wall portion 13 is disposed inside the rotor shaft 11 on the other axial side D2 and expands in the radial direction. The shaft wall portion 13 is disposed on the other axial side D2 with respect to the shaft through-hole 111. That is, the shaft wall portion 13 closes the opening at the end portion of the rotor shaft 11 on the other axial side D2. A radially outer end portion of the shaft wall portion 13 is connected to an inner surface of the rotor shaft 11. The shaft wall portion 13 may be integrated with the rotor shaft 11 or may be separated from the rotor shaft 11.

The motor 2 is a DC brushless motor. The motor 2 is a drive source of the drive apparatus 100, and is driven by electric power supplied from an inverter 4031 (see FIG. 3). The motor 2 is of an inner rotor type in which the rotor 21 is rotatably disposed radially inward of the stator 22. As illustrated in FIG. 1, the motor 2 includes the rotor 21 and the stator 22.

The rotor 21 is rotatable together with the motor shaft 1. The drive apparatus 100 includes the rotor 21. The rotor 21 is fixed to the motor shaft 1 and is rotatable about the first rotation axis J1. The rotor 21 rotates when electric power is supplied from the inverter 4031 of the drive apparatus 100 to the stator 22. The rotor 21 includes a rotor core 211 and a magnet 212. The rotor core 211 is a magnetic body and is formed by, for example, stacking thin electromagnetic steel plates in the axial direction. The rotor core 211 is fixed to the radially outer surface of the rotor shaft 11. A plurality of the magnets 212 are fixed to the rotor core 211. The plurality of magnets 212 are arranged along the circumferential direction with magnetic poles arranged alternately.

In addition, the rotor core 211 has the rotor through-hole 2111. The rotor through-hole 2111 penetrates the rotor core 211 in the axial direction and is connected to the shaft through-hole 111. The rotor through-hole 2111 is used as a flow path of the fluid F that also functions as the refrigerant. When the rotor 21 rotates, the fluid F flowing through the inside of the motor shaft 1 can flow into the rotor through-hole 2111 via the shaft through-hole 111. In addition, the fluid F flowing into the rotor through-hole 2111 can flow out from both axial end portions of the rotor through-hole 2111 to the outside. The fluid F having flowed out flies toward the stator 22 and cools, for example, a coil portion 222 (in particular, the coil end 2221 thereof) to be described later and the like. In addition, the flowed fluid F flies toward the rotor bearings 4211 and 4311 that rotatably support the motor shaft 1, and the like, and lubricates and cools them.

The stator 22 is arranged radially outward of the rotor 21. The drive apparatus 100 includes the stator 22. The stator 22 faces the rotor 21 with a gap therebetween in the radial direction. The stator 22 includes a stator core 221 and the coil portion 222. The stator 22 is held by the first housing tubular portion 41 to be described later and is fixed to an inner surface thereof. The stator core 221 has a plurality of magnetic pole teeth (not shown) extending radially inward from an inner surface of an annular yoke (not shown). The coil portion 222 is formed by winding a conductive wire around the magnetic pole teeth via an insulator (not illustrated). The coil portion 222 has the coil end 2221 protruding from an axial end surface of the stator core 221.

Next, the gear portion 3 is connected to the one axial side D1 of the motor shaft 1. As described above, the drive apparatus 100 includes the gear portion 3. The gear portion 3 is a power transmission device that transmits power of the motor 2 to a drive shaft Ds to be described later. The gear portion 3 includes a reduction gear 31 and a differential device 32.

The reduction gear 31 is connected to the gear shaft 12. The reduction gear 31 is arranged to increase the torque outputted from the motor 2 in accordance with a reduction ratio while reducing the rotation speed of the motor 2. The reduction gear 31 transmits the torque output from the motor 2 to the differential device 32. The reduction gear 31 includes a first gear 311, a second gear 312, a third gear 313, and an intermediate shaft 314.

The first gear 311 is fixed to the radially outer surface of the motor shaft 1 on the one axial side D1 of the motor shaft 1. The gear portion 3 includes the first gear 311. For example, the first gear 311 is disposed on the radially outer surface of the gear shaft 12. The first gear 311 may be integrated with the gear shaft 12 or may be separated from the gear shaft 12 and firmly fixed to the radially outer surface of the gear shaft 12. The first gear 311 is rotatable about the first rotation axis J1 together with the motor shaft 1.

The intermediate shaft 314 extends along a second rotation axis J2 and is rotatable about the second rotation axis J2. The second rotation axis J2 extends in the axial direction. The gear portion 3 includes the intermediate shaft 314. Both ends of the intermediate shaft 314 are supported rotatably about the second rotation axis J2 by a first intermediate bearing 4231 and a second intermediate bearing 4621. Hereinafter, the first intermediate bearing 4231 and the second intermediate bearing 4621 may be collectively referred to as "intermediate bearings 4231 and 4621".

The second gear 312 is fixed to the radially outer surface of the intermediate shaft 314 and meshes with the first gear 311. The third gear 313 is fixed to the radially outer surface of the intermediate shaft 314. The gear portion 3 includes the second gear 312 and the third gear 313. The third gear 313 is disposed on the other axial side D2 with respect to the second gear, and meshes with the fourth gear 321 of the differential device 32. Each of the second gear 312 and the third gear 313 may be integrated with the intermediate shaft 314 or may be separated from the intermediate shaft 314 and firmly fixed to the radially outer surface of the intermediate shaft 314. The second gear 312 and the third gear 313 are rotatable about the second rotation axis J2 together with the intermediate shaft 314.

The torque of the motor shaft 1 is transmitted from the first gear 311 to the second gear 312. Then, the torque transmitted to the second gear 312 is transmitted to the third gear 313 via the intermediate shaft 314. Further, torque is transmitted from the third gear 313 to the fourth gear 321.

The differential device 32 is attached to the drive shaft Ds and transmits torque transmitted from the reduction gear 31 to the drive shaft Ds. As described above, the gear portion 3 has the differential device 32. The differential device 32 includes the fourth gear 321 that meshes with the third gear 313, and outputs the torque of the fourth gear 321 to the drive shaft Ds. The fourth gear 321 is a so-called ring gear. The drive shaft Ds includes a first drive shaft Ds1 and a second drive shaft Ds2. The first drive shaft Ds1 is attached to the other axial side D2 of the differential device 32. The second drive shaft Ds2 is attached to the one axial side D1 of the differential device 32. For example, the differential device 32 transmits the torque to the drive shafts Ds1 and Ds2 on both the axial sides while absorbing a rotation speed difference between the drive shafts Ds1 and Ds2 on both the axial sides when the vehicle 300 turns.

The housing 4 accommodates the motor shaft 1, the motor 2 (in particular, the rotor 21 and the stator 22), and the gear portion 3. As described above, the drive apparatus 100 includes the housing 4. The housing 4 includes a first housing tubular portion 41, a side plate portion 42, the housing lid portion 43, a cover member 44, a second housing tubular portion 45, and the gear lid portion 46. The first housing tubular portion 41, the side plate portion 42, the housing lid portion 43, the cover member 44, the second housing tubular portion 45, and the gear lid portion 46 are formed using, for example, a conductive material, and in the present embodiment, are formed using a metal material such as iron, aluminum, or an alloy thereof. In addition, these are preferably formed using the same material in order to suppress contact corrosion of dissimilar metals at the contact portion. However, the present invention is not limited to this example, and these may be formed using materials other than the metal materials, or at least a part of these may be formed using different materials.

The housing 4 further includes a motor housing 401 and a gear housing 402. The motor housing 401 and the gear housing 402 will be described later. The housing 4 further includes an inverter housing 403. The inverter housing 403 accommodates the inverter 4031 that supplies a drive current to the stator 22.

The first housing tubular portion 41 has a cylindrical shape extending in the axial direction, and is an example of a "housing tubular portion" of the present invention. As described above, the housing 4 includes the first housing tubular portion 41. The stator 22 is fixed to the inner side surface of the first housing tubular portion 41. The motor 2 including the rotor 21, the stator 22, and the like, a fluid reservoir 54 to be described later, and the like are disposed inside the first housing tubular portion 41.

The side plate portion 42 is disposed on the one axial side D1 with respect to the first housing tubular portion 41 and expands in a direction intersecting the first rotation axis J1. As described above, the housing 4 has the side plate portion 42. The side plate portion 42 is an example of a "second lid portion" of the present invention. The side plate portion 42 is disposed at an end portion of the first housing tubular portion 41 on the one axial side D1 and covers an end portion of the first housing tubular portion 41 on the one axial side D1. The side plate portion 42 covers an end portion of the second housing tubular portion 45 on the other axial side D2. The side plate portion 42 expands in a direction intersecting the first rotation axis J1 and divides the first housing tubular portion 41 from the second housing tubular portion 45. In the present embodiment, the first housing tubular portion 41 and the side plate portion 42 are integrated. As a result, the rigidity of these portions can be enhanced. However, the present invention is not limited to this example, and both may be separate bodies.

The side plate portion 42 has a side plate through-hole 4201 and a first drive shaft through-hole 4202. The side plate through-hole 4201 and the first drive shaft through-hole 4202 penetrates the side plate portion 42 in the axial direction. The center of the side plate through-hole 4201 coincides with the first rotation axis J1. The motor shaft 1 extends through the side plate through-hole 4201. The center of the first drive shaft through-hole 4202 coincides with the third rotation axis J3. The first drive shaft Ds1 extends through the first drive shaft through-hole 4202. An oil seal (not illustrated) for sealing between the first drive shaft Ds1 and the first drive shaft through-hole 4202 is arranged in a gap therebetween.

The side plate portion 42 further includes a second rotor bearing holder 421, a first gear bearing holder 422, a first intermediate bearing holder 423, and a first drive bearing holder 424. The second rotor bearing holder 421 is disposed on the other axial side D2 of the inner surface of the side plate through-hole 4201 and holds the second rotor bearing 4211. The second rotor bearing 4211 rotatably supports the end portion of the rotor shaft 11 on the one axial side D1. The first gear bearing holder 422 is disposed on the one axial side D1 of the inner surface of the side plate through-hole 4201 and holds the first gear bearing 4221. The first gear bearing 4221 is another example of the "second bearing" of the present invention, and rotatably supports an end portion of the gear shaft 12 on the other axial side D2. The first intermediate bearing holder 423 is disposed on the end surface of the side plate portion 42 on the one axial side D1 and holds the first intermediate bearing 4231. The first intermediate bearing 4231 rotatably supports an end portion of the intermediate shaft 314 on the other axial side D2. The first drive bearing holder 424 is disposed on the inner surface of the first drive shaft through-hole 4202 and holds the first drive bearing 4241. The first drive bearing 4241 rotatably supports the first drive shaft Ds1.

The housing lid portion 43 expands in a direction intersecting the first rotation axis J1 and covers an end portion of the first housing tubular portion 41 on the other axial side D2. As described above, the housing 4 includes the housing lid portion 43. The housing lid portion 43 is an example of a "first lid portion" of the present invention, and is attached to an end portion of the first housing tubular portion 41 on the other axial side D2. The housing lid portion 43 can be fixed to the first housing tubular portion 41 by, for example, a screw, but is not limited thereto, and a method of firmly fixing the housing lid portion 43 to the first housing tubular portion 41, such as screwing or press-fitting, can be widely adopted. As a result, the housing lid portion 43 can be brought into close contact with the end portion of the first housing tubular portion 41 on the other axial side D2. Note that the term "close contact" means to have such a sealing property to an extent that the fluid F inside the members does not leak to the outside and to an extent that foreign matter such as external water, dirt, or dust does not enter. It is assumed that the same is applied below for the close contact.

The housing lid portion 43 includes a first rotor bearing holder 431. The first rotor bearing holder 431 holds the first rotor bearing 4311. The first rotor bearing 4311 rotatably supports the end portion of the rotor shaft 11 on the other axial side D2. The first rotor bearing holder 431 has an opening portion 4312 through which the rotor shaft 11 is inserted. The opening portion 4312 penetrates the housing lid portion 43 in the axial direction and surrounds the first rotation axis J1 when viewed from the axial direction.

The cover member 44 is disposed on the end surface of the housing lid portion 43 on the other axial side D2 and covers the opening portion 4312 and the end portion of the motor shaft 1 on the other axial side D2. The cover member 44 can be attached to the housing lid portion 43 by, for example, screwing, but is not limited thereto, and a method of firmly fixing the cover member 44 to the housing lid portion 43, such as screwing or press-fitting, can be widely adopted. A rotation detector (for example, a resolver) that detects the rotation angle of the rotor can be accommodated in a space surrounded by the cover member 44 and the housing lid portion 43. In this space, a neutralization apparatus that electrically connects the motor shaft 1 and the housing 4 may be disposed.

The second housing tubular portion 45 has a cylindrical shape surrounding the first rotation axis J1 and extends in the axial direction. An end portion of the second housing tubular portion 45 on the other axial side D2 is connected to the side plate portion 42 and covered by the side plate portion 42. In the present embodiment, the second housing tubular portion 45 is detachably attached to the end portion of the side plate portion 42 on the one axial side D1. In addition, the second housing tubular portion 45 can be attached to the side plate portion 42 by, for example, fixing with a screw, but is not limited thereto, and a method of firmly fixing the second housing tubular portion 45 to the side plate portion 42, such as screwing or press-fitting, can be widely adopted. As a result, the second housing tubular portion 45 can be brought into close contact with the end portion of the side plate portion 42 on the one axial side D1.

The gear lid portion 46 is disposed at the end portion of the second housing tubular portion 45 on the one axial side D1 and covers the end portion of the second housing tubular portion 45 on the one axial side D1. The gear lid portion 46 is disposed on the one axial side D1 with respect to the first housing tubular portion 41 and expands in a direction intersecting the first rotation axis J1. The gear lid portion 46 is another example of the "second lid portion" of the present invention. As described above, the housing 4 includes the gear lid portion 46. In the present embodiment, the second housing tubular portion 45 and the gear lid portion 46 are integrated. However, the present invention is not limited to this example, and both may be separate bodies.

The gear lid portion 46 includes a second drive shaft through-hole 460. The second drive shaft through-hole 460 penetrates the gear lid portion 46 in the axial direction. The center of the second drive shaft through-hole 460 coincides with a third rotation axis J3. The second drive shaft Ds2 extends through the second drive shaft through-hole 460. An oil seal (not illustrated) is disposed in a gap between the second drive shaft Ds2 and the second drive shaft through-hole 460.

The gear lid portion 46 further includes a second gear bearing holder 461, a second intermediate bearing holder 462, and a second drive bearing holder 463. The second gear bearing holder 461 and the second intermediate bearing holder 462 are disposed on the end surface of the gear lid portion 46 on the other axial side D2. The second gear bearing holder 461 holds a second gear bearing 4611. Hereinafter, the first gear bearing holder 422 and the second gear bearing holder 461 may be collectively referred to as "gear bearing holders 422 and 461". The housing 4 includes the gear bearing holders 422 and 461. The gear bearing holders 422 and 461 holds the gear bearings 4221 and 4611.

The second gear bearing 4611 is another example of the "second bearing" of the present invention, and rotatably supports an end portion of the gear shaft 12 on one axial side D1. The second intermediate bearing holder 462 holds the second intermediate bearing 4621. The second intermediate bearing 4621 rotatably supports the end portion of the intermediate shaft 314 on the one axial side D1. The second drive bearing holder 463 is disposed on the inner surface of the second drive shaft through-hole 460 and holds a second drive bearing 4631. The second drive bearing 4631 rotatably supports the second drive shaft Ds2.

The gear lid portion 46 has a flow path 464. The flow path 464 is a passage for the fluid F and connects the tray portion 465 and the inlet 121 of the motor shaft 1. The tray portion 465 has a recess which is recessed vertically downward. The tray portion 465 can store the fluid F scraped up by the gear (for example, the fourth gear 321) of the gear portion 3. In the present embodiment, the gear lid portion 46 has the tray portion 465. The tray portion 465 is disposed on an end surface of the gear lid portion 46 on the other axial side D2 and extends in the other axial side D2. The fluid F stored in the tray portion 465 is supplied to the flow path 464 and flows into the motor shaft 1 from the inlet 121 at the end portion of the motor shaft 1 on the one axial side D1.

Next, the motor housing 401 accommodates the rotor 21 and the stator 22. As described above, the housing 4 has the motor housing 401. In the present embodiment, the motor housing 401 includes the first housing tubular portion 41, the side plate portion 42, and the housing lid portion 43.

The first rotor bearing holder 431 and the second rotor bearing holder 421 are disposed in the motor housing 401. Hereinafter, the first rotor bearing holder 431 and the second rotor bearing holder 421 may be collectively referred to as "rotor bearing holders 421 and 431". The housing 4 includes the rotor bearing holders 421 and 431. The rotor bearing holders 421 and 431 hold the rotor bearings 4211 and 4311.

Further, hereinafter, the first rotor bearing holder 431, the second rotor bearing holder 421, the first gear bearing holder 422, and the second gear bearing holder 461 may be collectively referred to as "motor bearing holders 421, 431, 422, and 461". The housing 4 has motor bearing holders 421, 431, 422, and 461. The motor bearing holders 421, 431, 422, and 461 hold the motor bearings 4311, 4211, 4221, and 4611.

The rotor bearings 4211 and 4311 are disposed in the motor housing 401. The rotor bearings 4211 and 4311 rotatably support the motor shaft 1 on both axial sides of the rotor 21. The housing 4 has the rotor bearings 4211 and 4311. In the present embodiment, the rotor bearings 4211 and 4311 are ball bearings. The motor shaft 1 and the motor housing 401 are electrically insulated by the rotor bearings 4211 and 4311. However, the example of the present embodiment does not exclude a configuration in which at least one of the first rotor bearing 4311 and the second rotor bearing 4211 is a rolling bearing other than a ball bearing.

In the present embodiment, the rotor bearings 4211 and 4311 rotatably support both axial ends of the rotor shaft 11. With this configuration, as illustrated in FIG. 2, the electric charges flowing from the rotor shaft 11 due to the potential fluctuation in the rotor shaft 11 can be discharged to the housing 4 via the gear shaft 12 and the gear portion 3. In particular, in the present embodiment, when the drive apparatus 100 is in the powering state and the regeneration state, the internal teeth of the rotor shaft 11 and the external teeth of the gear shaft 12 are brought into metal contact, and the rotor shaft 11 is electrically connected to the gear shaft 12. Therefore, the electric charges of the rotor shaft 11 are discharged to the housing 4 by the above-described path, and are further discharged to an external object (a vehicle body 301 or the like) via the earth connection portion 6 connected to the gear housing 402 and the inverter housing 403, for example (see FIGS. 2 and 3). Therefore, even if the motor shaft 1 is divided, the occurrence of electrolytic corrosion in the motor bearings 4311, 4211, 4221, and 4611 can be effectively suppressed or prevented.

Figure 4A:
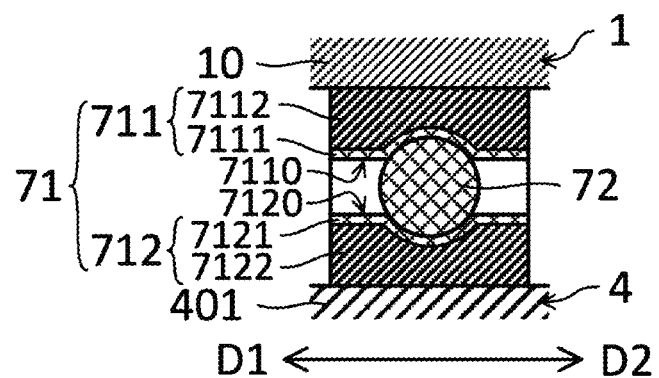
FIG. 4A is a cross-sectional view illustrating a configuration example of a motor bearing.
Figure 4B:
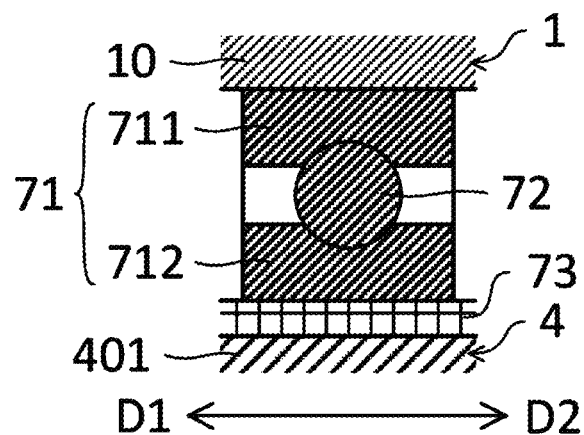
FIG. 4B is a cross-sectional view illustrating a first modification of the configuration of the motor bearing.
Figure 4C:
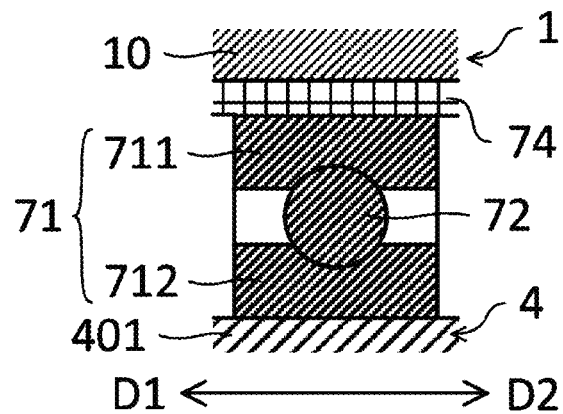
FIG. 4C is a cross-sectional view illustrating a second modification of the configuration of the motor bearing.

FIG. 4A is a cross-sectional view illustrating a configuration example of the motor bearings 4311, 4211, 4221, and 4611. FIG. 4B is a cross-sectional view illustrating a first modification of the configuration of the motor bearings 4311, 4211, 4221, and 4611. FIG. 4C is a cross-sectional view illustrating a second modification of the configuration of the motor bearings 4311, 4211, 4221, and 4611. In FIGS. 4A to 4C, the cross sections of the motor bearings 4311, 4211, 4221, and 4611 are viewed from the radial direction with reference to the first rotation axis J1.

For example, as illustrated in FIGS. 4A to 4C, each of the motor bearings 4311, 4211, 4221, and 4611 has a pair of bearing rings 71 and rolling elements 72. The pair of bearing rings 71 is disposed concentrically. The rolling elements 72 are rollably disposed between the pair of bearing rings 71.

The pair of bearing rings 71 includes an inner bearing ring 711 and an outer bearing ring 712 disposed radially outward of the inner bearing ring 711. The inner bearing ring 711 and the outer bearing ring 712 are made of metal, for example, and have an annular shape surrounding the first rotation axis J1. In FIG. 4A, the inner bearing ring 711 is fixed to the radially outer side of the rotor shaft 11 and the outer bearing ring 712 is fixed to the motor housing 401. The plurality of rolling elements 72 are arranged in the circumferential direction between the inner bearing ring 711 and the outer bearing ring 712.

Preferably, at least one of the surface of the rolling element 72, a first facing surface 7110 of the inner bearing ring 711 facing the rolling element 72, and a second facing surface 7120 of the outer bearing ring 712 facing the rolling element 72 has electrical insulation properties. With this configuration, in the motor bearings 4311, 4211, 4221, and 4611, discharge between the pair of bearing rings 71 and the rolling elements 72 can be suppressed or prevented. Therefore, it is possible to effectively suppress or prevent electrolytic corrosion of the motor bearings 4311, 4211, 4221, and 4611.

For example, in FIG. 4A, the rolling elements 72 are spheres having electrical insulation properties. Thus, in the motor bearings 4311, 4211, 4221, and 4611, discharge between the pair of bearing rings 71 and the rolling elements 72 can be suppressed or prevented. Therefore, it is possible to effectively suppress or prevent electrolytic corrosion of the motor bearings 4311, 4211, 4221, and 4611.

As an example, an electrically insulating layer formed by alumite treatment or the like may be disposed on the surface of the rolling element 72. In other words, the rolling elements 72 may include a metal sphere and an electrically insulating layer covering the surface of the sphere. However, the material of the electrically insulating layer of the rolling elements 72 and the method of forming the electrically insulating layer are not limited to these examples.

Alternatively, in FIG. 4A, the rolling elements 72 may be ceramic balls. In this way, the rolling elements 72 can more reliably suppress or prevent electric discharge between the pair of bearing rings 71. However, the present invention is not limited to this example, and in FIG. 4A, the rolling elements 72 may be spheres having electrical insulation properties other than ceramic balls.

In FIG. 4A, an electrically insulating layer 7111 formed by alumite treatment or the like is disposed on the first facing surface 7110 of the inner bearing ring 711. In other words, the inner bearing ring 711 may have the electrically insulating layer 7111 and a metal ring portion 7112. The electrically insulating layer 7111 covers the surface of the ring portion 7112 on the outer bearing ring 712 side. However, the materials of the ring portion 7112 and the electrically insulating layer 7111 and the method of forming the electrically insulating layer 7111 are not limited to the above-described examples.

In FIG. 4A, an electrically insulating layer 7121 formed by alumite treatment or the like is disposed on the second facing surface 7120 of the outer bearing ring 712. In other words, the outer bearing ring 712 may have the electrically insulating layer 7121 and a metal ring portion 7122. The electrically insulating layer 7121 covers the surface of the ring portion 7122 on the inner bearing ring 711 side. However, the materials of the ring portion 7122 and the electrically insulating layer 7121 and the method of forming the electrically insulating layer 7121 are not limited to the above-described examples.

In FIG. 4A, at least the surface of the rolling element 72, the first facing surface 7110, and the second facing surface 7120 all have electrical insulation properties. However, this example does not exclude a configuration in which at least two of these do not have electrical insulation properties.

For example, preferably, the rolling elements 72 of the second rotor bearing 4211, the first gear bearing 4221, and the second gear bearing 4611 are ceramic balls. In addition, the electrically insulating layer 7111 is not disposed on the first facing surface 7110 and the second facing surface 7120. At this time, the first facing surface 7110 of the inner bearing ring 711 of the first rotor bearing 4311 may have electrical insulation properties, and for example, the electrically insulating layer 7111 may be disposed. In addition, the second facing surface 7120 of the outer bearing ring 712 of the first rotor bearing 4311 may have electrical insulation properties, and for example, the electrically insulating layer 7111 may be disposed.

In this way, in the first rotor bearing 4311 that rotatably supports the other axial side D2 of the motor shaft 1 where whirling easily occurs in an accumulated tolerance, it is possible to ensure electrical insulation properties while improving wear resistance of the first facing surface 7110 and the like. In the motor bearings 4211, 4221, and 4611, the electrical insulation properties can be secured with a simple configuration by using ceramic balls as the rolling elements 72.

In addition, as long as the motor bearings 4311, 4211, 4221, and 4611 are electrically insulated from at least one of the rotor shaft 11 and the motor housing 401, the rolling elements 72, the inner bearing ring 711, and the outer bearing ring 712 may be members having electrical conductivity.

For example, in FIG. 4B, the motor bearings 4311, 4211, 4221, and 4611 further include a first insulating member 73. The first insulating member 73 is disposed between the outer bearing ring 712 and motor bearing holders 421, 431, 422, and 461. In the present embodiment, the first insulating member 73 has a tubular shape extending in the axial direction and has electrical insulation properties. The material of the first insulating member 73 is, for example, alumite. The outer bearing ring 712 of each of the motor bearings 4311, 4211, 4221, and 4611 is fixed to the motor bearing holders 421, 431, 422, and 461 via the first insulating member 73. As a result, the outer bearing ring 712 and the motor bearing holders 421, 431, 422, and 461 of the motor housing 401 can be electrically insulated by the first insulating member 73. For example, an electrical path from the inner bearing ring 711 of the first rotor bearing 4311 to the housing lid portion 43 can be insulated. In addition, an electrical path from the inner bearing ring 711 of the second rotor bearing 4211 to the side plate portion 42 can be insulated. The same applies to the other motor bearings 4221 and 4611. Therefore, discharge hardly occurs in the motor bearings 4311, 4211, 4221, and 4611. Therefore, it is possible to effectively suppress or prevent electrolytic corrosion of the motor bearings 4311, 4211, 4221, and 4611.

In FIG. 4C, the motor bearings 4311, 4211, 4221, and 4611 further include a second insulating member 74. The second insulating member 74 is disposed between the inner bearing ring 711 and the motor shaft 1 (specifically, the rotor shaft 11). In the present embodiment, the second insulating member 74 has a tubular shape extending in the axial direction and has electrical insulation properties. The material of the second insulating member 74 is, for example, alumite. The inner bearing ring 711 of each of the motor bearings 4311, 4211, 4221, and 4611 is fixed to the motor shaft 1 (specifically, the rotor shaft 11) via the second insulating member 74. As a result, the inner bearing ring 711 and the rotor shaft 11 can be electrically insulated by the second insulating member 74. An electrical path from the outer bearing ring 712 of each of the motor bearings 4311, 4211, 4221, and 4611 to the rotor shaft 11 can be insulated. Therefore, discharge hardly occurs in the motor bearings 4311, 4211, 4221, and 4611. Therefore, it is possible to effectively suppress or prevent electrolytic corrosion of the motor bearings 4311, 4211, 4221, and 4611.

Further, since the second insulating member 74 is disposed on the inner bearing ring 711 in advance, unlike the case where the second insulating member 74 is disposed on the rotor shaft 11 in advance, the positions where the motor bearings 4311, 4211, 4221, and 4611 are disposed with respect to the rotor shaft 11 need not be strictly determined. Therefore, it is easy to dispose the motor bearings 4311, 4211, 4221, and 4611. When the outer bearing rings 712 of the motor bearings 4311, 4211, 4221, and 4611 are respectively press-fitted into the motor bearing holders 421, 431, 422, and 461, the insulating member is not disposed on the outer bearing ring 712 side, so that the life of the insulating member can be improved.

The motor bearings 4311, 4211, 4221, and 4611 are not limited to the examples of FIGS. 4B and 4C, and may include both the first insulating member 73 and the second insulating member 74. In addition, the above-described configurations can be arbitrarily combined as long as there is no particular contradiction. Thus, the electrolytic corrosion of the motor bearings 4311, 4211, 4221, and 4611 can be more effectively suppressed or prevented.

The gear housing 402 accommodates the gear portion 3. As described above, the housing 4 includes the gear housing 402. In the present embodiment, the gear housing 402 includes the side plate portion 42, the second housing tubular portion 45, and the gear lid portion 46, and accommodates the reduction gear 31, the differential device 32, and the like.

A fluid storing portion P in which the fluid F is accumulated is disposed in a lower portion of the gear housing 402. Apart of the gear portion 3 (for example, the fourth gear 321) is immersed in the fluid storing portion P. The fluid F accumulated in the fluid storing portion P is scraped up by the operation of the gear portion 3 and supplied to the inside of the gear housing 402. For example, the fluid F is scraped up by the tooth surface of the fourth gear 321 when the fourth gear 321 of the differential device 32 rotates. Apart of the scraped fluid F is supplied to the gears and the bearings of the reduction gear 31 and the differential device 32 in the gear housing 402 and used for lubrication. Another part of the scraped fluid F is supplied to the inside of the motor shaft 1, is supplied to the rotor 21 and the stator 22 of the motor 2, and the bearings in the gear housing 402, and is used for cooling and lubrication.

In the gear housing 402, the first gear bearing holder 422 and the second gear bearing holder 461, and the gear bearings 4221 and 4611 are disposed. In the present embodiment, the gear bearings 4221 and 4611 rotatably support both axial ends of the gear shaft 12.

In the gear housing 402, the first drive bearing holder 424 and the second drive bearing holder 463, and the first drive bearing 4241 and the second drive bearing 4631 are disposed. Hereinafter, the first drive bearing 4241 and the second drive bearing 4631 may be collectively referred to as "drive bearings 4241 and 4631". The drive bearings 4241 and 4631 rotatably support both axial ends of the drive shaft Ds. The housing 4 includes drive bearings 4241 and 4631.

Figure 5:
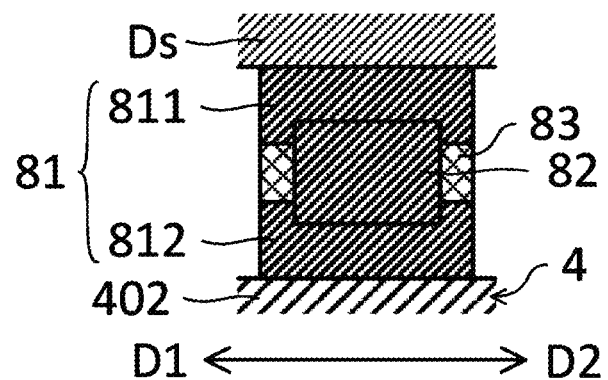
FIG. 5 is a cross-sectional view illustrating a configuration example of a first drive bearing and a second drive bearing.

The drive bearings 4241 and 4631 are roller bearings. FIG. 5 is a cross-sectional view illustrating a configuration example of the first drive bearing 4241 and the second drive bearing 4631. In FIG. 5, the cross sections of the drive bearings 4241 and 4631 are viewed from the radial direction with reference to a third rotation axis J3.

For example, as illustrated in FIG. 5, each of the drive bearings 4241 and 4631 has a pair of bearing rings 81 and a rolling element 82. The pair of bearing rings 81 is disposed concentrically. The rolling element 82 is rollably disposed between the pair of bearing rings 81 and has a shape having a longitudinal direction in the axial direction. The pair of bearing rings 81 includes an inner bearing ring 811 and an outer bearing ring 812 disposed radially outward of the inner bearing ring 811. The inner bearing ring 811 and the outer bearing ring 812 are made of metal, for example, and have an annular shape surrounding the third rotation axis J3. In FIG. 5, the inner bearing ring 811 is fixed to the radially outer surface of the drive shaft Ds, and the outer bearing ring 812 is fixed to the gear housing 402. The plurality of rolling elements 82 are arranged in the circumferential direction between the inner bearing ring 811 and the outer bearing ring 812. The rolling element 82 has electrical conductivity and is made of metal, for example. Therefore, the electric resistance of the drive bearings 4241 and 4631 is lower than that of the motor bearings 4311, 4211, 4221, and 4611.

As described above, since the rolling elements 82 of the drive bearings 4241 and 4631, which are roller bearings, have a shape having a longitudinal direction in the axial direction, the contact area with the pair of bearing rings 81 can be made larger than that of, for example, a ball bearing. Further, the drive bearings 4241 and 4631 have a lower electric resistance than the motor bearings 4311, 4211, 4221, and 4611. That is, the drive bearings 4241 and 4631 have higher electrical conductivity. On the other hand, as described above, the motor bearings 4311, 4211, 4221, and 4611 supporting the motor shaft 1 in the motor housing 401 are electrically insulated from the motor housing 401. Therefore, as illustrated in FIG. 2, the electric charges flowing from the rotor shaft 11 due to the potential fluctuation in the motor shaft 1 (in particular, the rotor shaft) are discharged to the gear housing 402 through the gear shaft 12, the first gear 311, the second gear 312, the third gear 313, the intermediate shaft 314, the differential device 32 including the fourth gear 321, the drive shaft Ds, and the drive bearings 4241 and 4631 when the drive apparatus 100 is in the powering state and the regeneration state. Further, this electric charges are discharged to, for example, the vehicle body 301 (see FIG. 3) and the like of the vehicle 300 on which the drive apparatus 100 is mounted, through the earth connection portion 6 connected to the gear housing 402, the inverter housing 403, and the like of the housing 4. Therefore, the occurrence of electrolytic corrosion in the motor bearings 4311, 4211, 4221, and 4611 can be more effectively suppressed or prevented.

In addition, by discharging the electric charges through the drive bearings 4241 and 4631, the static elimination channel between the gear shaft 12 and the gear housing 402 passes through the first gear 311, the second gear 312, the third gear 313, the intermediate shaft 314, the differential device 32 including the fourth gear 321, the drive shaft Ds, and the drive bearings 4241 and 4631. Therefore, the static elimination channel from the motor shaft 1 to the housing 4 can be made longer. Therefore, the potential difference between the motor shaft 1 and drive bearing holders 424 and 463 holding the drive bearings 4241 and 4631 of the housing 4 can be further increased. Therefore, the electric charges are easily released from the motor shaft 1 (in particular, the rotor shaft) to the housing 4.

A space between the pair of bearing rings 81 of the drive bearings 4241 and 4631 is lubricated by a lubricant 83. Preferably, the electrical conductivity of the lubricant 83 is higher than, for example, the fluid F. For example, conductive grease can be adopted as the lubricant 83. In the conductive grease, a conductive material such as copper powder or carbon powder is added to a lubricating oil such as grease. The improvement of the electrical conductivity of the lubricant 83 can contribute to the suppression or prevention of the occurrence of electrolytic corrosion. However, this example does not exclude a configuration in which the lubricant 83 is not disposed, and does not exclude a configuration in which the electrical conductivity of the lubricant 83 is not higher than, for example, the fluid F.

In the gear housing 402, the first intermediate bearing holder 423 and the second intermediate bearing holder 462, and the intermediate bearings 4231 and 4621 are disposed. The intermediate bearings 4231 and 4621 rotatably support both axial ends of the intermediate shaft 314. The housing 4 includes the intermediate bearings 4231 and 4621.

Figure 6:
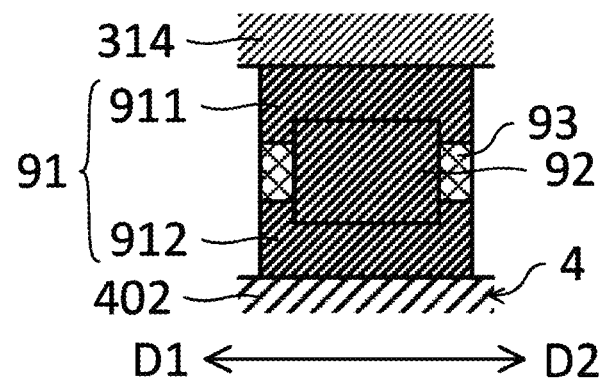
FIG. 6 is a cross-sectional view illustrating a configuration example of a first intermediate bearing and a second intermediate bearing.

In the present embodiment, the intermediate bearings 4231 and 4621 are roller bearings. FIG. 6 is a cross-sectional view illustrating a configuration example of the first intermediate bearing 4231 and the second intermediate bearing 4621. In FIG. 6, the cross sections of the intermediate bearings 4231 and 4621 are viewed from the radial direction with reference to the second rotation axis J2.

For example, as illustrated in FIG. 6, each of the intermediate bearings 4231 and 4621 has a pair of bearing rings 91 and a rolling element 92. The pair of bearing rings 91 is disposed concentrically. The rolling element 92 is rollably disposed between the pair of bearing rings 91 and has a shape having a longitudinal direction in the axial direction. The pair of bearing rings 91 includes an inner bearing ring 911 and an outer bearing ring 912 disposed radially outward of the inner bearing ring 911. The inner bearing ring 911 and the outer bearing ring 912 are made of metal, for example, and have an annular shape surrounding the second rotation axis J2. In FIG. 6, the inner bearing ring 911 is fixed to the radially outer side of the intermediate shaft 314 and the outer bearing ring 912 is fixed to the gear housing 402. The plurality of rolling elements 92 are arranged in the circumferential direction between the inner bearing ring 911 and the outer bearing ring 912. The rolling element 92 has electrical conductivity and is made of metal, for example. Therefore, the electric resistance of the intermediate bearings 4231 and 4621 is lower than that of the motor bearings 4311, 4211, 4221, and 4611.

As illustrated in FIG. 2, the electric charges flowing from the rotor shaft 11 due to the potential fluctuation in the rotor shaft 11 can flow to the intermediate shaft 314 via the gear shaft 12, the first gear 311, and the second gear 312 when the drive apparatus 100 is in the powering state and the regeneration state. Therefore, the electric charges can be further discharged to the gear housing 402 through the intermediate shaft 314 and the intermediate bearings 4231 and 4621. Further, the electric charges can be discharged to, for example, the vehicle body 301 (see FIG. 3) and the like of the vehicle 300 on which the drive apparatus 100 is mounted, through the earth connection portion 6 connected to the gear housing 402, the inverter housing 403, and the like of the housing 4. Therefore, the occurrence of electrolytic corrosion in the motor bearings 4311, 4211, 4221, and 4611 can be more reliably suppressed or prevented.

A space between the pair of bearing rings 91 of the intermediate bearings 4231 and 4621 is lubricated by a lubricant 93. Preferably, the electrical conductivity of the lubricant 93 is higher than, for example, the fluid F. For example, conductive grease can be adopted as the lubricant 93. In the conductive grease, a conductive material such as copper powder or carbon powder is added to a lubricating oil such as grease. The improvement of the electrical conductivity of the lubricant 93 can contribute to the suppression or prevention of the occurrence of electrolytic corrosion. However, this example does not exclude a configuration in which the lubricant 93 is not disposed, and does not exclude a configuration in which the electrical conductivity of the lubricant 93 is not higher than, for example, the fluid F.

The exemplification of the present embodiment does not exclude a configuration in which the intermediate bearings 4231 and 4621 are not roller bearings. For example, a configuration in which the intermediate bearings 4231 and 4621 are ball bearings or plain bearings is not excluded.

The fluid circulation portion 5 will be described next. The fluid circulation portion 5 includes a pipe portion 51, a pump 52, a cooler unit 53, and a fluid reservoir 54.

The pipe portion 51 connects the pump 52 and the fluid reservoir 54 disposed inside the first housing tubular portion 41. The pump 52 sucks the fluid F stored in the fluid storing portion P and supplies the fluid F to the fluid reservoir 54. The pump 52 is an electric pump in the present embodiment.

The cooler unit 53 is disposed between the pump 52 and the fluid reservoir 54 in the pipe portion 51. That is, the fluid F sucked by the pump 52 passes through the cooler unit 53 via the pipe portion 51 and then is sent to the fluid reservoir 54. For example, a refrigerant such as water supplied from the outside is supplied to the cooler unit 53. The cooler unit 53 exchanges heat between the refrigerant and the fluid F to lower the temperature of the fluid F.

The fluid reservoir 54 is a tray disposed vertically above the stator 22 inside the motor housing 401. A dropping hole (whose reference sign is omitted) is formed at a bottom of the fluid reservoir 54, and the motor 2 is cooled by dropping the fluid F from the dropping hole. The dropping hole is formed above the coil end 2221 of the coil portion 222 of the stator 22, for example, and the coil portion 222 is cooled by the fluid F.

The earth connection portion 6 grounds the housing 4 to an external object. As described above, the drive apparatus 100 further includes the earth connection portion 6. In the present embodiment, the earth connection portion 6 is a conductive cable in which a conductor wire is insulated and covered. One end of the conductive cable is electrically connected to the housing 4, and the other end is electrically connected to, for example, the vehicle body 301 of the vehicle 300 (see FIG. 3). In this way, the housing 4 can be grounded to an external object (for example, the vehicle body 301 of the vehicle 300) via the earth connection portion 6. Therefore, since the electric charges discharged from the motor shaft 1 (in particular, the rotor shaft 11) to the housing 4 can be discharged to an external object, an increase in the potential of the housing 4 can be suppressed or prevented. The occurrence of electrolytic corrosion in the motor bearings 4311, 4211, 4221, and 4611 can be more reliably suppressed or prevented.

Preferably, as illustrated in FIG. 3, the earth connection portion 6 is disposed in the inverter housing 403. For example, one end of the above-described conductive cable is electrically connected to the inverter housing 403. In this way, the earth connection portion 6 can further ground the inverter housing 403 to an object outside the housing 4 (for example, the vehicle body 301 of the vehicle 300). Therefore, it is possible to further suppress or prevent an increase in the ground potential of the inverter 4031 accommodated in the inverter housing 403. However, this example does not exclude a configuration in which the earth connection portion 6 is disposed in a portion other than the inverter housing 403 of the housing 4. For example, the earth connection portion 6 may be connected to the motor housing 401, the gear housing 402 (see FIG. 2), and the like.

Figure 7:
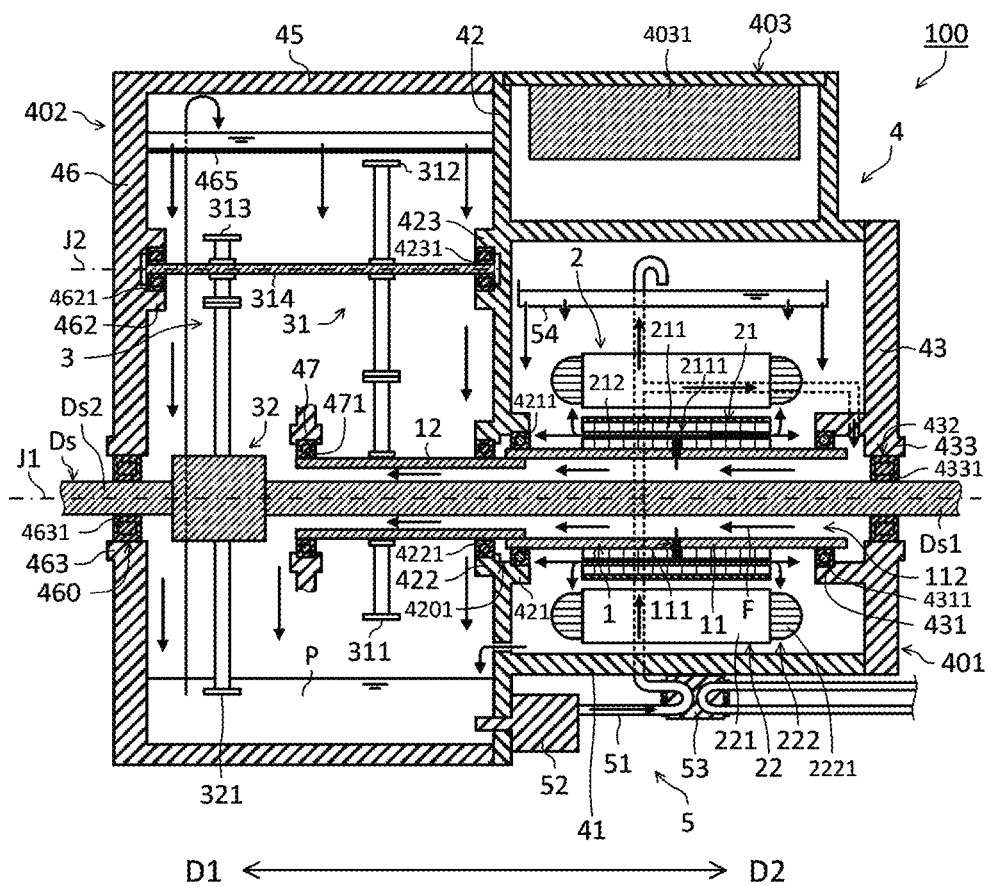
FIG. 7 is a schematic configuration diagram of a drive apparatus according to a modification.
Figure 8:
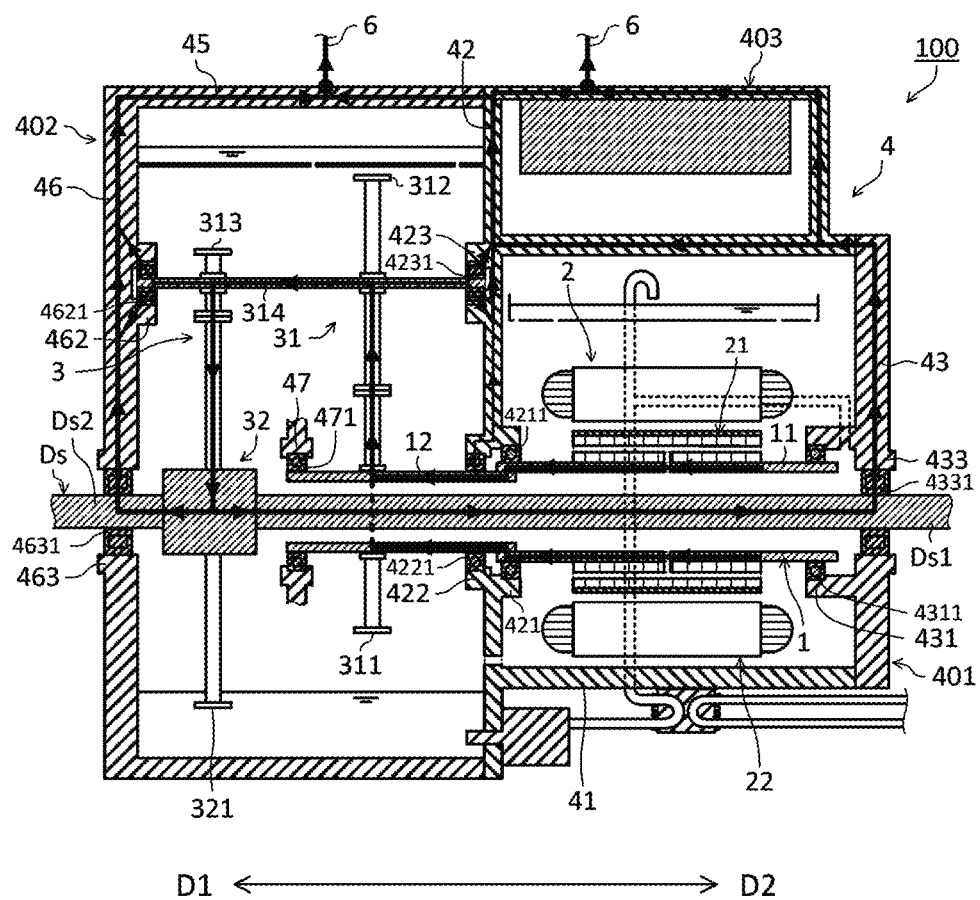
FIG. 8 is a conceptual diagram illustrating a static elimination channel of a drive apparatus according to a modification.

Next, a modification of the embodiment will be described with reference to FIGS. 7 and 8. FIG. 7 is a schematic configuration diagram of the drive apparatus 100 according to a modification. FIG. 8 is a conceptual diagram illustrating a static elimination channel of the drive apparatus 100 according to a modification. Note that FIGS. 7 and 8 are merely conceptual diagrams, and the arrangement and dimensions of each portion are not necessarily the same as those of the actual drive apparatus 100. In FIG. 8, a thick solid line with an arrow indicates a static elimination channel. Hereinafter, a configuration different from that of the above embodiment will be described. In addition, the same components as those in the above-described embodiment are denoted by the same reference signs, and the description thereof may be omitted.

In the modification, the motor shaft 1 has a tubular shape extending in the axial direction. The drive shaft Ds is inserted into the cylindrical motor shaft 1 extending in the axial direction and extends along the first rotation axis J1. This eliminates the need to secure a space for disposing the drive shaft Ds radially outward of the motor shaft 1. Therefore, the size of the drive apparatus 100 in the direction perpendicular to the axial direction can be further reduced. Therefore, the drive apparatus 100 can be downsized. In addition, the gap between the drive shaft Ds and the motor shaft 1 can be used as a flow path through which the fluid F functioning as a refrigerant flows.

The drive shaft Ds is rotatable about the first rotation axis J1. That is, the rotation axis of the drive shaft Ds coincides with the first rotation axis J1. When the rotation centers of the drive shaft Ds and the motor shaft 1 coincide with each other, the gap between the drive shaft Ds and the motor shaft 1 in the radial direction with respect to the first rotation axis J1 can be made constant. Therefore, the fluid F can flow through the gap without changing the flow rate and the flow resistance in the circumferential direction with reference to the first rotation axis J1.

Specifically, a part (that is, a central portion in the axial direction) of the first drive shaft Ds1 is disposed inside the motor shaft 1. When viewed from the axial direction, the first drive shaft Ds1 is disposed concentrically with the motor shaft 20. An end portion of the first drive shaft Ds1 on the other axial side D2 is disposed on the other axial side D2 with respect to the motor shaft 1.

In the modification, a first drive shaft through-hole 432 through which the first drive shaft Ds1 is inserted is disposed in the housing lid portion 43 instead of the side plate portion 42. The housing lid portion 43 further includes the first drive shaft through-hole 432. The first drive shaft through-hole 432 penetrates the housing lid portion 43 in the axial direction. The center of the first drive shaft through-hole 432 coincides with the first rotation axis J1. An oil seal (not illustrated) that seals between the first drive shaft Ds1 and the first drive shaft through-hole 432 is disposed in a gap between the first drive shaft Ds1 and the first drive shaft through-hole.

The housing lid portion 43 further includes a first drive bearing holder 433 and a first drive bearing 4331. The first drive bearing holder 433 is disposed on the inner surface of the first drive shaft through-hole 432 and holds the first drive bearing 4331. The first drive bearing 4331 rotatably supports the first drive shaft Ds1.

The first drive bearing holder 433 is connected to the pipe portion 51. Therefore, the first drive bearing 4331 is lubricated and cooled by a part of the fluid F flowing through the pipe portion 51. The fluid F flows into the motor shaft 1. That is, in the modification, the opening at the end portion on the other axial side D2 of the motor shaft 1 is an inlet 112 of the fluid F. A part of the fluid F flowing into the motor shaft 1 from the inlet 112 flows into the rotor through-hole 2111 through the shaft through-hole 111. The remaining part is discharged from the end portion of the motor shaft 1 on the one axial side D1 and accumulated in the fluid storing portion P.

The second drive shaft Ds2 and the differential device 32 are disposed on the one axial side D1 with respect to the motor shaft 1. A second gear bearing 471 rotatably holding the end portion of a motor shaft 20 on the one axial side D1 is held by a second gear bearing holder 47. That is, the housing 4 includes the second gear bearing holder 47 and the second gear bearing 471 instead of the second gear bearing holder 461 and the second gear bearing 4611. The second gear bearing holder 47 is disposed on the other axial side D2 with respect to the differential device 32, and is disposed in the side plate portion 42 or the second housing tubular portion 45.

In the modification, similarly to the above-described embodiment, the motor shaft 1 and the motor housing 401 are electrically insulated by the motor bearings 4311, 4211, 4221, and 4611. The first drive bearing 4331 and the second drive bearing 4631 are roller bearings. In the modification, the first drive bearing 4331 and the second drive bearing 4631 are collectively referred to as "drive bearings 4331 and 4631". The electric resistance of the drive bearings 4331 and 4631 is lower than that of the motor bearings 4311, 4211, 4221, and 4611. As described above, since the rolling elements 82 of the drive bearings 4331 and 4631, which are roller bearings, have a shape having a longitudinal direction in the axial direction, the contact area with the pair of bearing rings 81 can be made larger than that of, for example, a ball bearing. Therefore, the drive bearings 4331 and 4631 have higher electrical conductivity.

Therefore, as illustrated in FIG. 8, the electric charges flowing from the rotor shaft 11 due to the potential fluctuation in the motor shaft 1 (in particular, the rotor shaft) are discharged to the gear shaft 12, the first gear 311, the second gear 312, the intermediate shaft 314, the third gear 313, the differential device 32 including the fourth gear 321, and the drive shaft Ds when the drive apparatus 100 is in the powering state and the regeneration state. Further, the electric charges are discharged to the motor housing 401 of the housing 4 through the first drive bearing 4331, and are discharged to the gear housing 402 of the housing 4 through the second drive bearing 4631. These electric charges are discharged to, for example, the vehicle body 301 (see FIG. 3) of the vehicle 300 on which the drive apparatus 100 is mounted, through the earth connection portion 6 connected to the gear housing 402, the inverter housing 403, and the like of the housing 4. Therefore, the occurrence of electrolytic corrosion in the motor bearings 4311, 4211, 4221, and 4611 can be more effectively suppressed or prevented.

In addition, by discharging electric charges through the drive bearings 4331 and 4631, the static elimination channel between the gear shaft 12 and the housing 4 passes through the first gear 311, the second gear 312, the third gear 313, the intermediate shaft 314, the differential device 32 including the fourth gear 321, the drive shaft Ds, and the drive bearings 4331 and 4631. Therefore, the static elimination channel from the motor shaft 1 to the housing 4 can be made longer. Therefore, the potential difference between the motor shaft 1 and the drive bearing holders 433 and 463 holding the drive bearings 4331 and 4631 of the housing 4 can be further increased. Therefore, the electric charges are easily released from the motor shaft 1 (in particular, the rotor shaft) to the housing 4.

In the modification, as in the above-described embodiment, the electric resistance of the intermediate bearings 4231 and 4621 is lower than that of the motor bearings 4311, 4211, 4221, and 4611. Therefore, as illustrated in FIG. 8, the electric charges flowing from the rotor shaft 11 due to the potential fluctuation in the rotor shaft 11 are discharged to the gear housing 402 via the gear shaft 12, the first gear 311, the second gear 312, the intermediate shaft 314, and the intermediate bearings 4231 and 4621 when the drive apparatus 100 is in the powering state and the regeneration state. Further, the electric charges can be discharged to, for example, the vehicle body 301 (see FIG. 3) and the like of the vehicle 300 on which the drive apparatus 100 is mounted, through the earth connection portion 6 connected to the gear housing 402, the inverter housing 403, and the like of the housing 4. Therefore, the occurrence of electrolytic corrosion in the motor bearings 4311, 4211, 4221, and 4611 can be more reliably suppressed or prevented.

The embodiment of the present invention has been described above. Note that the scope of the present invention is not limited to the above-described embodiment. The present invention can be implemented by making various modifications to the above-described embodiment within a range not departing from the gist of the invention. Further, the matters described in the above-described embodiments are arbitrarily combined together as appropriate within a range where no inconsistency occurs.

In the present embodiment and the modification, the present invention is applied to the in-vehicle drive apparatus 100. However, the present invention is not limited to this example, and the present invention is also applicable to drive apparatuses or the like used for applications other than in-vehicle applications.

Hereinafter, the embodiments described so far and modifications thereof will be collectively described.

For example, a drive apparatus disclosed herein is configured (first configuration) to include:
  a motor shaft that extends along a first rotation axis extending in an axial direction and is rotatable about the first rotation axis;
  a rotor rotatable together with the motor shaft;
  a stator disposed radially outward of the rotor;
  a gear portion connected to one axial side of the motor shaft; and
  a housing that accommodates the rotor, the stator, and the gear portion,
  in which the housing includes:
  a housing tubular portion that extends in an axial direction and holds the stator on an inner side surface;
  a first lid portion that is attached to another axial end portion of the housing tubular portion;
  a second lid portion that is disposed on one axial side with respect to the housing tubular portion and expands in a direction intersecting the first rotation axis; and
  a motor bearing that rotatably supports the motor shaft, the motor bearing includes:
  a first bearing that is a rolling bearing disposed on the first lid portion, the first bearing rotatably supporting the motor shaft on another axial side with respect to the rotor; and
  a second bearing that is disposed on the second lid portion and rotatably supports the motor shaft on one axial side with respect to the rotor, and
  the motor shaft and the first lid portion are electrically insulated by a first bearing.

The drive apparatus according to the first configuration may be configured (second configuration) such that
  the motor shaft includes:
  a first shaft that holds the rotor; and
  a second shaft that is connected to one axial end portion of the first shaft and to which the gear portion is connected.

In addition, the drive apparatus according to the first or second configuration may be configured (third configuration) such that
  the second lid portion is a side plate portion that is disposed at one axial end portion of the housing tubular portion and covers one axial end portion of the housing tubular portion,
  the second motor bearing is a rolling bearing disposed in the side plate portion and rotatably supports the motor shaft on the one axial side with respect to the rotor, and
  the motor shaft and the side plate portion are electrically insulated from each other by the second bearing.

In addition, the drive apparatus according to the third configuration may be configured (fourth configuration) such that
  an electric resistance in the first bearing is larger than an electric resistance in the second bearing.

In addition, the drive apparatus according to any one of the first to fourth configurations may be configured (fifth configuration) such that
  the motor bearing includes:
  a pair of bearing rings disposed concentrically; and
  a rolling element rollably disposed between the pair of bearing rings,
  the pair of bearing rings includes an inner bearing ring and an outer bearing ring disposed radially outward of the inner bearing ring, and
  at least one of a surface of the rolling element, a first facing surface of the inner bearing ring facing the rolling element, and a second facing surface of the outer bearing ring facing the rolling element has electrical insulation property.

In addition, the drive apparatus according to the fifth configuration may be configured (sixth configuration) such that
  the rolling element is a ceramic ball.

In addition, the drive apparatus of the fifth configuration may be configured (seventh configuration) such that
  the first facing surface of the first bearing has electrical insulation property, and
  the rolling element of the second bearing is a ceramic ball.

In addition, the drive apparatus according to any one of the fifth to seventh configurations may be configured (eighth configuration) such that
  the housing further includes a motor bearing holder that holds the motor bearing,
  the motor bearing further includes a first insulating member disposed between the outer bearing ring and the motor bearing holder, and the outer bearing ring is fixed to the motor bearing holder via the first insulating member.

In addition, the drive apparatus according to any one of the fifth to eighth configurations may be configured (ninth configuration) such that the motor bearing further includes a second insulating member disposed between the inner bearing ring and the motor shaft, and the inner bearing ring is fixed to the motor shaft via the second insulating member.

In addition, the drive apparatus according to any one of the first to ninth configurations may be configured (tenth configuration) to further include a fluid flow path through which a fluid for lubricating the motor bearing is supplied to the motor bearing.

In addition, the drive apparatus according to any one of the first to tenth configurations may be configured (eleventh configuration) such that the gear portion includes:

a first gear fixed to a radially outer surface of the motor shaft on one axial side of the motor shaft;

an intermediate shaft extending along a second rotation axis extending in an axial direction and rotatable about the second rotation axis;

a second gear fixed to a radially outer surface of the intermediate shaft and meshing with the first gear;

a third gear fixed to a radially outer surface of the intermediate shaft; and a differential device that includes a fourth gear meshing with the third gear and outputs torque of the fourth gear to a drive shaft, the housing further includes a drive bearing that rotatably supports both axial ends of the drive shaft, the first bearing is a ball bearing, the drive bearing is a roller bearing, and an electric resistance of the drive bearing is lower than an electric resistance of the first bearing.

In addition, the drive apparatus according to any one of the first to eleventh configurations may be configured (twelfth configuration) such that the housing further includes an intermediate bearing that rotatably supports both axial ends of the intermediate shaft, and the intermediate bearing has a lower electric resistance than the first bearing.

In addition, the drive apparatus according to any one of the first to twelfth configurations may be configured (thirteenth configuration) to further include an earth connection portion that grounds the housing to an external object.

In addition, the drive apparatus according to the thirteenth configuration may be configured (fourteenth configuration) such that the housing further includes an inverter housing that accommodates an inverter that supplies a drive current to the stator, and the earth connection portion is disposed in the inverter housing.

In addition, the drive apparatus according to any one of the first to fourteenth configurations may be configured (fifteenth configuration) such that the motor shaft has a tubular shape extending in an axial direction, and the drive shaft is inserted into the motor shaft.

In addition, a vehicle disclosed in this specification may be configured (sixteenth configuration) to include the drive apparatus according to any one of the first to fifteenth configurations.

The present invention is useful, for example, in a device having a motor in which a motor shaft is rotatably supported by a rolling bearing. Note that the above-described device is useful for in-vehicle applications, but is also useful for applications other than in-vehicle applications.

Features of the above-described preferred embodiments and the modifications thereof may be combined appropriately as long as no conflict arises.

While preferred embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

What is claimed is:

1. A drive apparatus comprising:
a motor shaft that extends along a first rotation axis extending in an axial direction and is rotatable about the first rotation axis;
a rotor rotatable together with the motor shaft;
a stator disposed radially outward of the rotor;
a gear portion connected to one axial side of the motor shaft; and
a housing that accommodates the rotor, the stator, and the gear portion,
wherein the housing includes:
a housing tubular portion that extends in an axial direction and holds the stator on an inner side surface;
a first lid portion that is attached to another axial end portion of the housing tubular portion;
a second lid portion that is disposed on one axial side with respect to the housing tubular portion and expands in a direction intersecting the first rotation axis; and
a motor bearing that rotatably supports the motor shaft,
the motor bearing includes:
a first bearing that is a rolling bearing disposed on the first lid portion, the first bearing rotatably supporting the motor shaft on another axial side with respect to the rotor; and
a second bearing that is disposed on the second lid portion and rotatably supports the motor shaft on one axial side with respect to the rotor, and
the motor shaft and the first lid portion are electrically insulated by a first bearing, wherein
an electric resistance in the first bearing is larger than an electric resistance in the second bearing.

2. The drive apparatus according to claim 1, wherein the motor shaft includes:
a first shaft that holds the rotor; and
a second shaft that is connected to one axial end portion of the first shaft and to which the gear portion is connected.

3. The drive apparatus according to claim 1, wherein
the second lid portion is a side plate portion that is disposed at one axial end portion of the housing tubular portion and covers the one axial end portion of the housing tubular portion,
the second motor bearing is a rolling bearing disposed in the side plate portion and rotatably supports the motor shaft on the one axial side with respect to the rotor, and
the motor shaft and the side plate portion are electrically insulated from each other by the second bearing.

4. The drive apparatus according to claim 1, wherein
the motor bearing includes:
a pair of bearing rings disposed concentrically; and
a rolling element rollably disposed between the pair of bearing rings, the pair of bearing rings includes an inner bearing ring and an outer bearing ring disposed radially outward of the inner bearing ring, and at least one of a surface of the rolling element, a first facing surface of the inner bearing ring facing the rolling element, or a second facing surface of the outer bearing ring facing the rolling element has electrical insulation property.

5. The drive apparatus according to claim 4, wherein the rolling element is a ceramic ball.

6. The drive apparatus according to claim 4, wherein
the first facing surface of the first bearing has electrical insulation property, and
the rolling element of the second bearing is a ceramic ball.

7. The drive apparatus according to claim 4, wherein
the housing further includes a motor bearing holder that holds the motor bearing,
the motor bearing further includes a first insulating member disposed between the outer bearing ring and the motor bearing holder, and
the outer bearing ring is fixed to the motor bearing holder via the first insulating member.

8. The drive apparatus according to claim 4, wherein
the motor bearing further includes a second insulating member disposed between the inner bearing ring and the motor shaft, and
the inner bearing ring is fixed to the motor shaft via the second insulating member.

9. The drive apparatus according to claim 1, further comprising a fluid flow path through which a fluid for lubricating the motor bearing is supplied to the motor bearing.

10. The drive apparatus according to claim 1, wherein
the gear portion includes:
a first gear fixed to a radially outer surface of the motor shaft on one axial side of the motor shaft;
an intermediate shaft extending along a second rotation axis extending in an axial direction and rotatable about the second rotation axis;
a second gear fixed to a radially outer surface of the intermediate shaft and meshing with the first gear;
a third gear fixed to a radially outer surface of the intermediate shaft; and
a differential device that includes a fourth gear meshing with the third gear and outputs torque of the fourth gear to a drive shaft,
the housing further includes a drive bearing that rotatably supports both axial ends of the drive shaft,
the first bearing is a ball bearing,
the drive bearing is a roller bearing, and
an electric resistance of the drive bearing is lower than an electric resistance of the first bearing.

11. The drive apparatus according to claim 1, wherein
the housing further includes an intermediate bearing that rotatably supports both axial ends of the intermediate shaft, and
the intermediate bearing has a lower electric resistance than the first bearing.

12. The drive apparatus according to claim 1, further comprising an earth connection portion that grounds the housing to an external object.

13. The drive apparatus according to claim 12, wherein
the housing further includes an inverter housing that accommodates an inverter that supplies a drive current to the stator, and
the earth connection portion is disposed in the inverter housing.

14. The drive apparatus according to claim 1, wherein
the motor shaft has a tubular shape extending in an axial direction, and
a drive shaft is inserted into the motor shaft.

15. A vehicle comprising the drive apparatus according to claim 1.

16. A drive apparatus comprising:
a motor shaft that extends along a first rotation axis extending in an axial direction and is rotatable about the first rotation axis;
a rotor rotatable together with the motor shaft;
a stator disposed radially outward of the rotor;
a gear portion connected to one axial side of the motor shaft; and
a housing that accommodates the rotor, the stator, and the gear portion,
wherein the housing includes:
a housing tubular portion that extends in an axial direction and holds the stator on an inner side surface;
a first lid portion that is attached to another axial end portion of the housing tubular portion;
a second lid portion that is disposed on one axial side with respect to the housing tubular portion and expands in a direction intersecting the first rotation axis; and
a motor bearing that rotatably supports the motor shaft,
the motor bearing includes:
a first bearing that is a rolling bearing disposed on the first lid portion, the first bearing rotatably supporting the motor shaft on another axial side with respect to the rotor; and
a second bearing that is disposed on the second lid portion and rotatably supports the motor shaft on one axial side with respect to the rotor, and
the motor shaft and the first lid portion are electrically insulated by a first bearing, wherein
the motor bearing includes:
a pair of bearing rings disposed concentrically; and
a rolling element rollably disposed between the pair of bearing rings,
the pair of bearing rings includes an inner bearing ring and an outer bearing ring disposed radially outward of the inner bearing ring, and
at least one of a surface of the rolling element, a first facing surface of the inner bearing ring facing the rolling element, and a second facing surface of the outer bearing ring facing the rolling element has electrical insulation property.

17. A drive apparatus comprising:
a motor shaft that extends along a first rotation axis extending in an axial direction and is rotatable about the first rotation axis;
a rotor rotatable together with the motor shaft;
a stator disposed radially outward of the rotor;
a gear portion connected to one axial side of the motor shaft; and
a housing that accommodates the rotor, the stator, and the gear portion,
wherein the housing includes:
a housing tubular portion that extends in an axial direction and holds the stator on an inner side surface;
a first lid portion that is attached to another axial end portion of the housing tubular portion;
a second lid portion that is disposed on one axial side with respect to the housing tubular portion and expands in a direction intersecting the first rotation axis; and
a motor bearing that rotatably supports the motor shaft,
the motor bearing includes:

a first bearing that is a rolling bearing disposed on the first lid portion, the first bearing rotatably supporting the motor shaft on another axial side with respect to the rotor; and a second bearing that is disposed on the second lid portion and rotatably supports the motor shaft on one axial side with respect to the rotor, and the motor shaft and the first lid portion are electrically insulated by a first bearing; and an earth connection portion that grounds the housing to an external object, wherein the housing further includes an inverter housing that accommodates an inverter that supplies a drive current to the stator, and the earth connection portion is disposed in the inverter housing.

18. A drive apparatus comprising:

a motor shaft that extends along a first rotation axis extending in an axial direction and is rotatable about the first rotation axis;

a rotor rotatable together with the motor shaft;

a stator disposed radially outward of the rotor;

a gear portion connected to one axial side of the motor shaft; and a housing that accommodates the rotor, the stator, and the gear portion, wherein the housing includes:

a housing tubular portion that extends in an axial direction and holds the stator on an inner side surface;

a first lid portion that is attached to another axial end portion of the housing tubular portion;

a second lid portion that is disposed on one axial side with respect to the housing tubular portion and expands in a direction intersecting the first rotation axis; and a motor bearing that rotatably supports the motor shaft, the motor bearing includes:

a first bearing that is a rolling bearing disposed on the first lid portion, the first bearing rotatably supporting the motor shaft on another axial side with respect to the rotor; and a second bearing that is disposed on the second lid portion and rotatably supports the motor shaft on one axial side with respect to the rotor, and the motor shaft and the first lid portion are electrically insulated by a first bearing, wherein the motor shaft has a tubular shape extending in an axial direction, and a drive shaft is inserted into the motor shaft.

* * * * *